March 30, 1943.   M. E. DAYTON   2,314,870
COUPLER
Filed Oct. 7, 1939   3 Sheets-Sheet 1

Inventor:
Max E. Dayton
By
McCanna, Wintercorn & Morsbach
Attys.

March 30, 1943. M. E. DAYTON 2,314,870
COUPLER
Filed Oct. 7, 1939 3 Sheets-Sheet 2
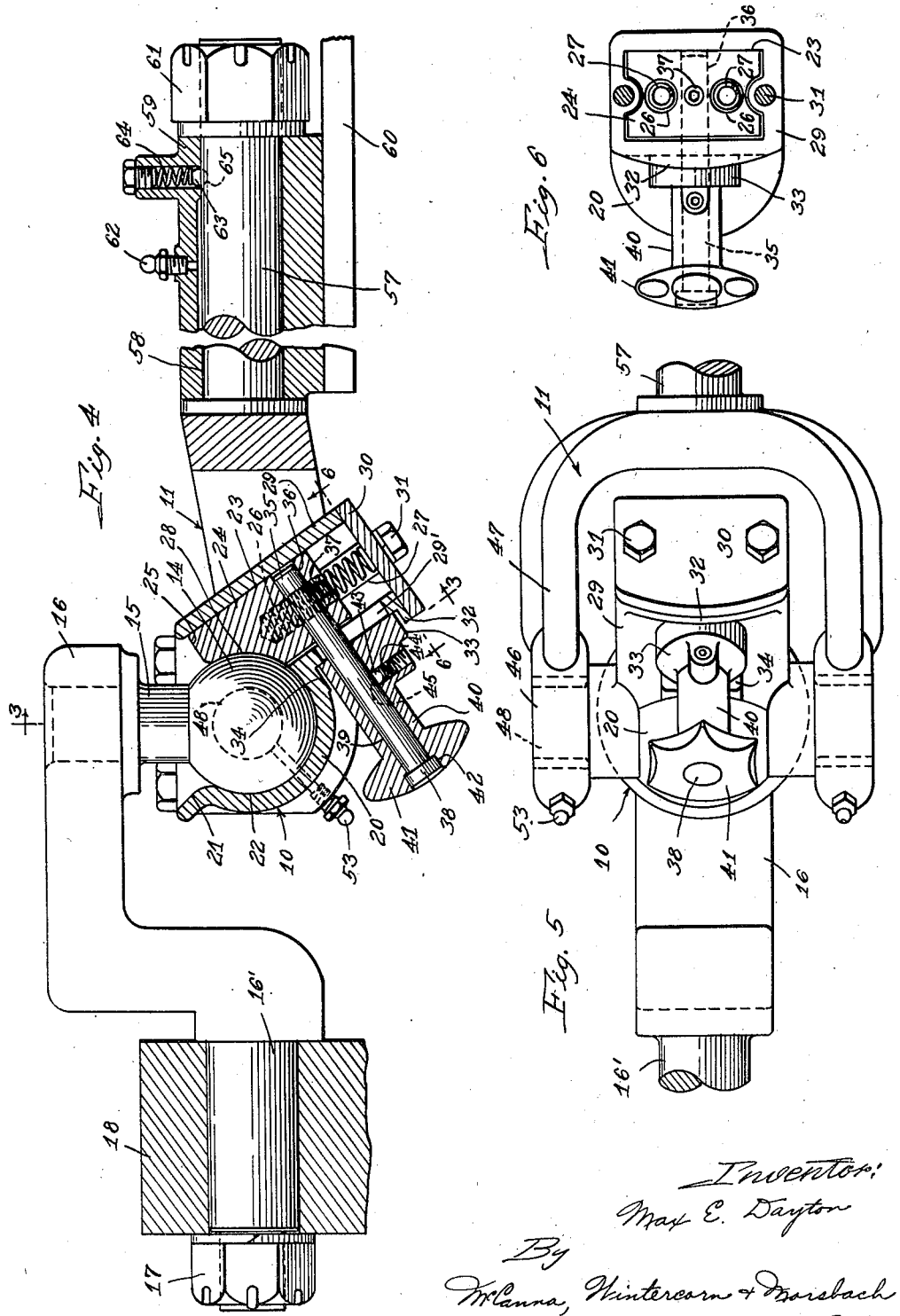
Inventor:
Max E. Dayton
By
McCanna, Wintercorn & Marsbach
Attys.

March 30, 1943.  M. E. DAYTON  2,314,870
COUPLER
Filed Oct. 7, 1939  3 Sheets-Sheet 3
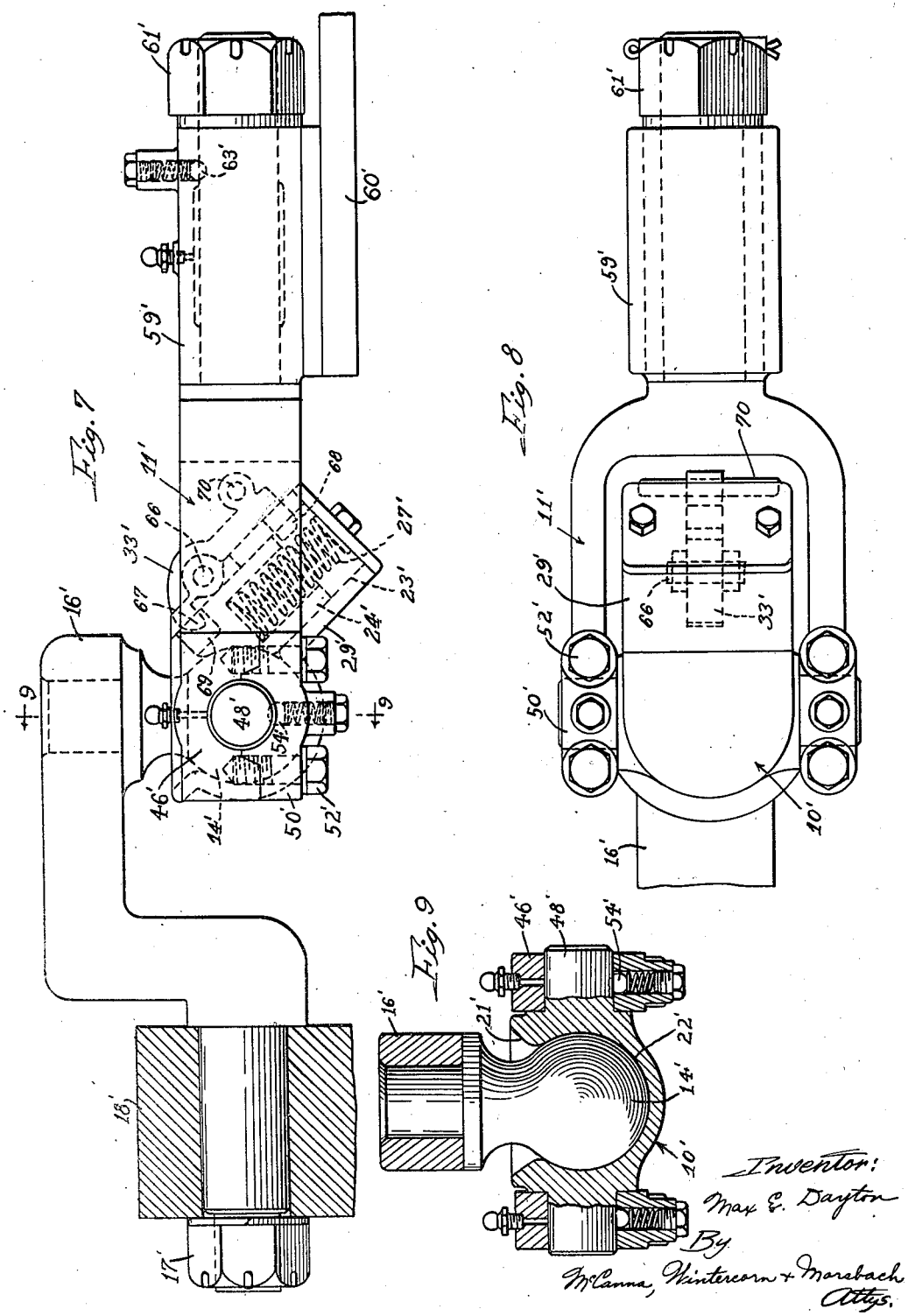

Patented Mar. 30, 1943

2,314,870

UNITED STATES PATENT OFFICE 2,314,870

COUPLER

Max E. Dayton, Rockford, Ill.

Application October 7, 1939, Serial No. 298,344

21 Claims. (Cl. 280—33.17)

This invention relates to a new and improved coupler for detachably coupling a trailing vehicle to a towing vehicle, and is more particularly concerned with a combined coupler and adapter assembly that will allow universal movement of the trailing vehicle with respect to the towing vehicle, such an assembly being particularly suited for use with mobile artillery, for example.

The assembly of my invention embodies a ball and socket type coupling similar to that shown in my Patent No. 2,090,113, issued August 17, 1937, but modified to better suit the special requirements of the assembly, and has a large forked yoke member pivotally connected with the socket member of the coupling on a transverse axis, the forked yoke member being swiveled on the towing vehicle on a longitudinal axis so as to permit actually 360° movement of the trailing vehicle about its longitudinal axis with respect to the towing vehicle, which while not necessary or desirable in the case of house-type trailers and the like, is nevertheless considered essential in the case of mobile artillery.

An important object of the invention is the provision of easily accessible means in conjunction with the ball locking plunger on the socket member for moving the same to retracted position so that the trailing vehicle may be uncoupled regardless of what position it may happen to assume with respect to the towing vehicle at the time it is to be uncoupled, and, of course, the same holds true so far as coupling is concerned.

Another object consists in the provision of spring pressed ball detents on the various parts of the assembly to facilitate coupling and uncoupling. Thus, for example, a ball detent serves to lock the forked yoke member releasably in a position with the trunnion bearings thereof in a horizontal plane, and other ball detents on the bearings serve to hold the trunnions on the socket member of the coupling locked releasably in a position where the socket is open side up for easy insertion of the ball. Another ball detent on the manually rotatable cam provided for retracting the ball locking plunger serves to lock the cam releasably in a position preventing the ball locking plunger from moving out of operative position.

Other objects and advantages of the invention will appear in the course of the following description, in which—

Fig. 4 is a longitudinal section through the assembly;

Fig. 5 is a bottom view of so much of the assembly as appears in Fig. 2;

Fig. 6 is a sectional detail on the line 6—6 of Fig. 4;

Fig. 7 is a side view of another assembly showing a modified or alternative construction;

Fig. 8 is a bottom view of the main portion of Fig. 7, and

Fig. 9 is a cross-section on the line 9—9 of Fig. 7.

Similar reference numerals are applied to corresponding parts throughout the views.

Figure 1:
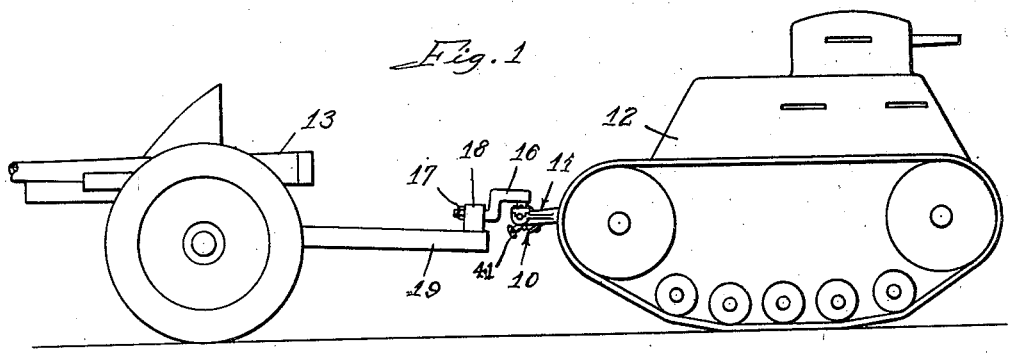
Fig. 1 is a side view of an armored tank towing a mobile gun to which the same is detachably connected by the improved coupler of my invention.
Figure 2:
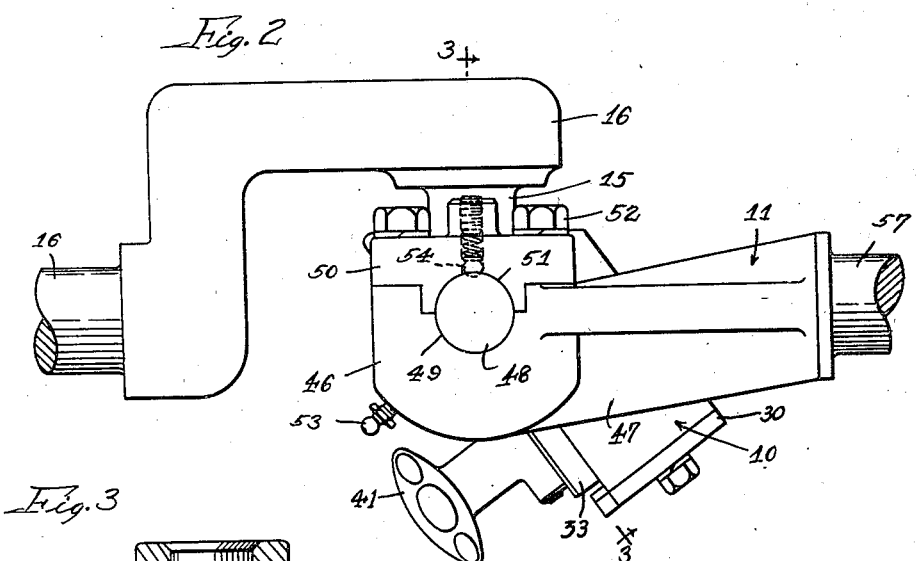
Fig. 2 is a side view of the coupler assembly on a larger scale.
Figure 3:
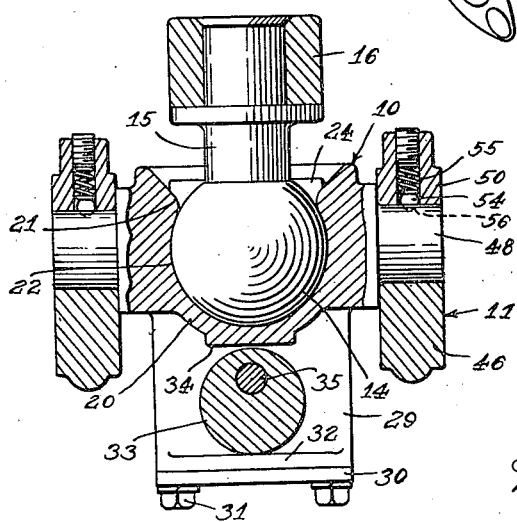
Fig. 3 is a cross-section on the broken lines 3—3 of Figs. 2 and 4.

The ordinary house-type trailer hitch of the ball and socket type is not suitable for use with mobile artillery because of the small range of relative movement permitted between the towing and trailing vehicles with such hitches. In fact, the military requirement goes to the extent of requiring actually 360° movement of the trailing vehicle about its longitudinal axis with respect to the towing vehicle and about 90° movement both ways from a normal horizontal position about a transverse axis. The present coupler assembly consisting of coupling 10 and adapter 11 has been designed to meet these requirements while at the same time permitting easy coupling and uncoupling regardless of the relative positions of the vehicles, which in the illustration, Fig. 1, are an armored tank 12 and gun 13.

The coupling 10 conforms generally to the disclosure in my Patent 2,090,113, except that the ball member 14 which is ordinarily on the towing vehicle and projects upwardly from its support is carried on a shank 15 projecting downwardly from an L-shaped yoke 16 that has a reduced cylindrical shank 16' that is bolted rigidly, as indicated at 17, onto a boss 18 on the tail piece 19 of the gun. The socket member 20 which is ordinarily carried on the towing vehicle with the open side facing downwardly to receive the upwardly projecting ball on the towing vehicle is in the present assembly inverted so that the open side 21 faces upwardly and the member is carried on the adapter 11 mounted on the tank 12, so that the downwardly projecting ball 14 may be entered easily in the socket 22. The socket member 20 in accordance with the aforesaid patent has an angularly inclined bore 23 communicating with the socket 22 and slidably receiving a ball locking plunger 24. The outer end 25 of the plunger 24 is beveled and the inner end is recessed, as at 26, to receive coiled compression springs 27 that normally support the plunger in a position partially obstructing the opening 21. A spherical-shaped depression 28 in the side of the plunger 24 adjacent the inner end thereof conforms to the ball 14 like the socket 22 and in the ball locking position the depression 28 is in effect a continuation of the spherical contour of the socket 22. The hollow extension 29 of the socket member 20 in which the angular bore 23 is provided for the plunger 24 has a plate 30 closing the end thereof remote from the socket 22 and secured in place by screws 31. A transverse flange 32 is formed on the end of the extension 29 which is backed up by the plate 30, and this flange provides one of two diametrically opposed abutments for the plunger operating cam 33, the other abutment 34 being a transverse shoulder in parallelism with the flange 32 and provided directly on the side of the socket member 20. A pin 35 entered through a slot 29' in the wall of the extension 29 is received in a transverse hole 36 in the inner end of the plunger 24 and held in place in said hole by a set-screw 37. This pin has a head 38 on its outer end to retain the cam 33 which, as clearly appears in Fig. 4, has a longitudinal bore 39 to receive the pin 35, the cam having a reduced shank portion 40 projecting therefrom and terminating in an enlarged manually operable knob portion 41 in which a counterbore 42 is provided to accommodate the head end 38 of the pin. A spring-pressed detent ball 43 carried in a radial bore 44 in the shank portion 40 of the cam 33 is arranged to snap into a depression 45 provided therefore in the pin 35 when the cam 33 is in the position shown in Fig. 4 with the ball locking plunger 24 in ball retaining position. However, the ball detent 43 will ride out of the depression 45 when sufficient force is exerted on the knob 41 to turn the cam 33 in either direction, and when the cam is turned and slides on the abutment 34, the plunger 24 is retracted against the action of the springs 27 of which there are two ordinarily provided, as indicated in Fig. 6, on opposite sides of the pin 35. When the ball 14 is later entered again in the socket 22, the operator merely turns the knob 41 until the detent ball 43 snaps back into the depression 45 with an audible click, which is enough to indicate that the plunger 24 is back in its normal operative position. The plunger 24 will of course move under the action of the springs 27, but in the event there is any resistance to such movement, the cam 33 sliding on the flange 32 will easily overcome such resistance. The flange 32 backed up by the plate 30 provides ample support for the cam 33 to positively limit backward movement of the plunger 24 under pressure of the ball 14, and the small amount of movement permitted is not sufficient to give rise to any danger of the ball 14 getting out of the socket 22. Here again the ball detent 43 serves as a safety lock eliminating any likelihood of the cam 33 being vibrated or jarred out of the ball retaining position.

The adapter 11 is in the form of a U-shaped yoke providing trunnion bearings 46 on the two arms 47 thereof to receive cylindrical trunnion projections 48 provided on diametrically opposite sides of the socket member 20. The bearings 46 are provided half in the arms 47 of the adapter yoke, as at 49, and half in plates 50, as at 51, the plates 50 being bolted to the arms 47 of the yoke, as at 52. The nipples indicated at 53 are for lubrication of the trunnion bearings. Spring-pressed detent balls 54 are mounted in holes 55 provided therefor in the plates 50 and are arranged to snap into depressions 56 provided therefor in the trunnions 48 so as to hold the socket member 20 releasably in the position illustrated with respect to the adapter yoke 11, in which position the ball 14 can be easily entered through the opening 21 into the socket 22. Of course, these ball detents will ride easily into and out of the depressions 56 when the vehicles are coupled together and assume different positions of angularity with respect to one another in the travel thereof. It is only when the vehicles are uncoupled that it is important to keep the socket member 20 with its open side 21 up, and the ball detents 54 assure such positioning. The adapter yoke 11 has a reduced cylindrical shank 57 which has a swivel fit in the bore 58 of a block 59 welded or otherwise suitably secured to the tail piece 60 on the tank 12, a castellated nut 61, similar to that shown at 17, being provided to securely bolt the adapter yoke to the tank. A lubricator nipple is indicated at 62 for lubrication of the bearing 58 so as to assure easy turning of the adapter yoke 11 about its longitudinal axis, and it is of course obvious that the yoke can readily turn through 360°. A spring-pressed detent ball 63 provided in a hole 64 in the block 59 is adapted to snap into a depression 65 provided therefor in the shank 57 of the yoke to lock the yoke releasably in a normal position with the trunnion bearings 46 in a substantially horizontal plane. This detent, like the detents 54, is therefore a further means of assuring easier coupling, the thought being to keep the parts held in readiness for easy entry of the ball 14 in the socket 42 when the vehicles are to be coupled together, without, however, interfering with the more or less easy turning of the adapter yoke 11 during the travel of the vehicles when coupled together, it being obvious that the ball 63 will readily ride into and out of the depression 65 as occasion requires.

The construction illustrated in Figs. 7 to 9 is substantially the same, 10' being the coupling and 11' the forked adapter yoke, and all of the other parts of the assembly that correspond more or less closely to the parts of the one just described being similarly numbered using prime numerals. The principal difference in this assembly lies in the use of a different type of actuating means in conjunction with a ball locking plunger 24'. In this assembly, a lever 33' is provided pivoted intermediate its ends, as at 66, and having inwardly projecting lugs 67 and 68 on the opposite ends thereof, the lugs 67 fitting in a depression 69 in the outer end of the plunger 24', whereas the lug 68 is arranged to project into the bore 23' behind the plunger 24' to limit backward movement of the plunger under pressure of the ball 14'. A T-shaped handle 70 on the same end of the lever 33' with the lug 68 provides a means for manually operating the lever to move the plunger 24' to retracted position against the spring 27' which normally holds the plunger in ball retaining position.

It is believed the foregoing description conveys a good understanding of the objects and advantages of my invention. The appended claims have been drawn with a view to covering all legitimate modifications and adaptations.

I claim:

1. A coupler assembly of the class described comprising, in combination, a ball member having a ball head portion and a reduced neck portion, a socket member having a ball receiving socket with an opening communicating therewith for extension therethrough of the reduced neck portion of the ball member when the head portion thereof is received in the socket, means for detachably securing the ball head in the socket, a forked yoke for pivotally supporting the socket member between the arms thereof, trunnion bearings on the arms of said yoke on opposite sides of the socket member, and trunnions projecting from opposite sides of said socket member in a plane extending diametrically through the socket member and ball head received therein, said trunnions being pivotally received in said bearings.

2. A coupler assembly of the class described comprising, in combination, a ball member having a ball head portion and a reduced neck portion, a socket member having a ball receiving socket with an opening communicating therewith for extension therethrough of the reduced neck portion of the ball member when the head portion thereof is received in the socket, means for detachably securing the ball head in the socket, a forked yoke for pivotally supporting the socket member between the arms thereof, said yoke having a cylindrical shank portion for supporting the same, a bearing rotatably receiving said shank portion for swivel mounting of the yoke on a suitable support, trunnion bearings on the arms of said yoke on opposite sides of the socket member, and trunnions projecting from opposite sides of said socket member and pivotally received in said bearings, whereby to pivotally support the socket member on an axis in transverse relation to the swivel axis of the yoke.

3. A coupler assembly of the class described comprising, in combination, a ball member having a ball head portion and a reduced neck portion, a socket member having a ball receiving socket with an opening communicating therewith for extension therethrough of the reduced neck portion of the ball member when the head portion thereof is received in the socket, means for detachably securing the ball head in the socket, a forked yoke for pivotally supporting the socket member between the arms thereof, trunnion bearings on the arms of said yoke on opposie sides of the socket member, trunnions projecting from opposite sides of said socket member and pivotally received in said bearings, and spring-pressed detent means for releasably locking the socket member in a predetermined position of rotary adjustment with relation to the yoke.

4. A coupler assembly of the class described comprising, in combination, a ball member having a ball head portion and a reduced neck portion, a socket member having a ball receiving socket with an opening communicating therewith for extension therethrough of the reduced neck portion of the ball member when the head portion thereof is received in the socket, means for detachably securing the ball head in the socket, a forked yoke for pivotally supporting the socket member between the arms thereof, said yoke having a cylindrical shank portion for supporting the same, a bearing rotatably receiving said shank portion for swivel mounting of the yoke on a suitable support, trunnion bearings on the arms of said yoke on opposite sides of the socket member, trunnions projecting from opposite sides of said socket member and pivotally received in said bearings, whereby to pivotally support the socket member on an axis in transverse relation to the swivel axis of the yoke, and spring-pressed detent means for releasably locking the socket member in a predetermined position of rotary adjustment relative to the yoke and for releasably locking the yoke in a predetermined position of rotary adjustment with respect to its shank bearing.

5. A coupler assembly of the class described comprising a pair of yokes adapted to be detachably connected by an intermediate coupling, one of said yokes being supported on a towing vehicle and the other on a trailing vehicle, a ball member comprising a ball head portion and a reduced neck portion projecting upwardly therefrom and mounted on one of said yokes, the other of said yokes being forked, a socket member pivotally mounted between the arms of the forked yoke on an axis extending through the center of the ball head received therein and transversely relative to the longitudinal axis of said forked yoke, said socket member having a ball receiving socket therein with an opening communicating with the top thereof for extension therethrough of the reduced neck portion of the ball member when the ball head is received in the socket, and means for detachably securing the ball head in the socket.

6. A coupler assembly of the class described comprising a pair of yokes adapted to be detachably connected by an intermediate coupling, one of said yokes being supported on a towing vehicle and the other on a trailing vehicle, a ball member comprising a ball head portion and a reduced neck portion projecting upwardly therefrom and mounted on one of said yokes, the other of said yokes being forked, a socket member pivotally mounted between the arms of the forked yoke and having a ball receiving socket therein with an opening communicating with the top thereof for extension therethrough of the reduced neck portion of the ball member when the ball head is received in the socket, means for detachably securing the ball head in the socket, the socket member being rotatable between the arms of the forked yoke, and means for releasably locking the socket member in a predetermined position of rotary adjustment with respect to the yoke with the socket opening on top for easy entry of the ball head into the socket.

7. A coupler assembly of the class described comprising a pair of yokes adapted to be detachably connected by an intermediate coupling, one of said yokes being supported on a towing vehicle and the other on a trailing vehicle, a ball member comprising a ball head portion and a reduced neck portion projecting upwardly therefrom and mounted on one of said yokes, the other of said yokes being forked, a socket member pivotally mounted between the arms of the forked yoke on an axis extending through the center of the ball head received therein and transversely relative to the longitudinal axis of said forked yoke, said socket member having a ball receiving socket therein with an opening communicating with the top thereof for extension therethrough of the reduced neck portion of the ball member when the ball head is received in the socket, means for detachably securing the ball head in the socket, and means for rotatably supporting the forked yoke for rotation about its longitudinal axis.

8. A coupler assembly of the class described comprising a pair of yokes adapted to be detachably connected by an intermediate coupling, one of said yokes being supported on a towing vehicle and the other on a trailing vehicle, a ball member comprising a ball head portion and a reduced neck portion projecting upwardly therefrom and mounted on one of said yokes, the other of said yokes being forked, a socket member pivotally mounted between the arms of the forked yoke and having a ball receiving socket therein with an opening communicating with the top thereof for extension therethrough of the reduced neck portion of the ball member when the ball head is received in the socket, means for detachably securing the ball head in the socket, the socket member being rotatable between the arms of the forked yoke, means for releasably locking the socket member in a predetermined position of rotary adjustment with respect to the yoke with the socket opening on top for easy entry of the ball head into the socket, means for rotatably supporting the forked yoke for rotation about its longitudinal axis, and means for releasably locking the forked yoke in a predetermined position of rotary adjustment with respect to the last-mentioned means so that the socket member is disposed with the opening therein on top.

9. A coupler assembly of the class described comprising a pair of yokes, one of which is rigidly mounted on a vehicle and the other of which is swiveled horizontally on its longitudinal axis on another vehicle, one of said yokes being forked for detachable coupling connection with the other yoke, and a detachable ball and socket coupling comprising detachably universally pivotally interfitting ball and socket members one of which is pivotally mounted in the fork of the forked yoke on an axis extending through the center of the ball head transversely relative to the longitudinal axis of said forked yoke and the other of which is mounted on the other yoke.

10. A coupler assembly of the class described comprising a pair of yokes, one of which is rigidly mounted on a vehicle and the other of which is swiveled horizontally on its longitudinal axis on another vehicle, one of said yokes being forked for detachable coupling connection with the other yoke, a detachable ball and socket coupling comprising detachably universally pivotally interfitting ball and socket members one of which is pivotally mounted in the fork of the forked yoke on an axis in transverse relation to the longitudinal axis of the forked yoke and the other of which is mounted on the other yoke, and means for releasably locking the swiveled yoke in a predetermined position of rotary adjustment to facilitate interconnection of the coupling members on the two yokes.

11. A coupler assembly of the class described comprising a pair of yokes, one of which is rigidly mounted on a vehicle and the other of which is swiveled horizontally on its longitudinal axis on another vehicle, one of said yokes being forked for detachable coupling connection with the other yoke, a detachable ball and socket coupling comprising detachably universally pivotally interfitting ball and socket members one of which is pivotally mounted in the fork of the forked yoke on an axis in transverse relation to the longitudinal axis of the forked yoke and the other of which is mounted on the other yoke, and means for releasably locking the pivotally mounted coupling member in a predetermined position of rotary adjustment thereof with respect to the forked yoke to facilitate interconnection of the coupling members.

12. A coupler assembly of the class described comprising a pair of yokes, one of which is rigidly mounted on a vehicle and the other of which is swiveled horizontally on its longitudinal axis on another vehicle, means for releasably locking the swiveled yoke in a predetermined position of rotary adjustment with respect to the other yoke, one of said yokes being forked for detachable coupling connection with the other yoke, a coupling comprising a pair of detachably interfitting members one of which is pivotally mounted in the fork of the forked yoke on an axis in transverse relation to the longitudinal axis of the forked yoke and the other of which is mounted on the other yoke, and means for releasably locking the pivoted coupling member in a predetermined position of rotary adjustment thereof with respect to the forked yoke.

13. In a coupling, the combination of a pair of yokes, one carried on a towing vehicle and the other on a trailing vehicle, one of said yokes having a forked end portion, a socket member for a ball and socket coupling having diametrically opposed pivotal connections with the two arms of the forked yoke, the socket in said socket member being open, a ball head carried on the other yoke and adapted to be entered in said socket, the socket member having a hollow extension opening from one side of the socket between the aforesaid pivots and projecting between the arms of the forked yoke, said arms being elongated sufficiently to provide working clearance for said extension in the pivotal movement of the socket member and forked yoke relative to one another, and a ball locking plunger slidable in said extension into and out of engagement with the ball head.

14. A coupling as set forth in claim 13, including means for releasably locking the socket in a predetermined position of rotary adjustment with respect to the forked yoke to facilitate entry of the ball head in the socket thereof.

15. A coupling of the class described comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball whereby to prevent withdrawal thereof from the socket, spring means normally urging the plunger toward ball engaging position, a pin extending transversely from the outer end of said plunger through a slot provided therefor in the wall of said extension, a manually rotatable cam on the projecting end portion of said pin, and means providing abutments rigid with respect to said socket member on diametrically opposite sides of said cam for sliding engagement therewith, one of said abutments coacting with the cam in the retracting movement of the plunger and the other abutment coacting with the cam to positively limit retracting movement of the plunger under thrust of the ball thereon.

16. A coupling as set forth in claim 15, wherein the cam is rotatable on the pin, the coupling including spring-pressed detent means for releasably locking the cam in a predetermined position of rotary adjustment with respect to the pin holding the ball locking plunger in ball retaining position.

17. A coupler asesmbly of the class described comprising a pair of yokes adapted to be detachably connected by an intermediate coupling, one of said yokes being supported on a towing vehicle and the other on a trailing vehicle, a ball member comprising a ball head portion and a reduced neck portion projecting upwardly therefrom and mounted on one of said yokes, the other of said yokes being forked, a socket member pivotally mounted between the arms of the forked yoke and having a ball receiving socket therein with an opening communicating with the top thereof for extension therethrough of the reduced neck portion of the ball member when the ball head is received in the socket, means for detachably securing the ball head in the socket, the socket member being rotatable between the arms of the forked yoke, means for releasably locking the socket member in a predetermined position of rotary adjustment with respect to the yoke with the socket opening on top for easy entry of the ball head into the socket, and means for supporting the forked yoke so that the socket member is disposed with the opening therein on top.

18. A coupler assembly of the class described comprising a pair of yokes adapted to be detachably connected by an intermediate coupling, one of said yokes being supported on a towing vehicle and the other on a trailing vehicle, a ball member comprising a ball head portion and a reduced neck portion projecting upwardly therefrom and mounted on one of said yokes, the other of said yokes being forked, a socket member pivotally mounted between the arms of the forked yoke and having a ball receiving socket therein with an opening communicating with the top thereof for extension therethrough of the reduced neck portion of the ball member when the ball head is received in the socket, means for detachably securing the ball head in the socket, the socket member being rotatable between the arms of the forked yoke, means for releasably locking the socket member in a predetermined position of rotary adjustment with respect to the yoke with the socket opening on top for easy entry of the ball head into the socket, and means for supporting the forked yoke for rotation about its longitudinal axis.

19. A coupler assembly of the class described comprising, in combination, a ball member having a ball head portion and a reduced neck portion, a socket member having a ball receiving socket with an opening communicating with the top thereof for extension upwardly therethrough of the reduced neck portion of the ball member when the head portion is received in the socket, means for detachably securing the ball head in the socket, a forked yoke for pivotally supporting the socket member between the arms thereof, said yoke having a cylindrical shank portion for supporting the same, a bearing rotatably receiving said shank portion for swivel mounting of the yoke on a suitable support, trunnion bearings on the arms of said yoke on opposite sides of the socket member, and trunnions projecting from opposite sides of said socket member and pivotally received in said bearings, whereby to pivotally support the socket member on an axis in transverse relation to the swivel axis of the yoke.

20. A coupler assembly of the class described comprising, in combination, a ball member having a ball head portion and a reduced neck portion, a socket member having a ball receiving socket with an opening communicating therewith for extension therethrough of the reduced neck portion of the ball member when the head portion thereof is received in the socket, means for detachably securing the ball head in the socket, a forked yoke for pivotally supporting the socket member between the arms thereof, said yoke having a cylindrical shank portion for supporting the same, a bearing rotatably receiving said shank portion for swivel mounting of the yolk on a suitable support, trunnion bearings on the arms of said yoke on opposite sides of the socket member, trunnions projecting from opposite sides of said socket member and pivotally received in said bearings, whereby to pivotally support the socket member on an axis in transverse relation to the swivel axis of the yoke, and spring-pressed detent means for releasably locking the yoke in a predetermined position of rotary adjustment with respect to its shank bearing.

21. A coupler assembly of the class described comprising, in combination, an inner swivel coupling member, an outer swivel coupling member detachably receiving the inner coupling member, means for detachably securing said coupling members together, a forked yoke for pivotally supporting the outer coupling member between the arms thereof, said yoke having a cylindrical shank portion for supporting the same, a bearing rotatably receiving said shank portion for swivel mounting of the yoke on a suitable support, trunnion bearings on the arms of said yoke on opposite sides of the socket member, and trunnions projecting from opposite sides of said socket member and pivotally received in said bearings, whereby to pivotally support the socket member on an axis in transverse relation to the swivel axis of the yoke.

MAX E. DAYTON.